Patented Mar. 20, 1928.

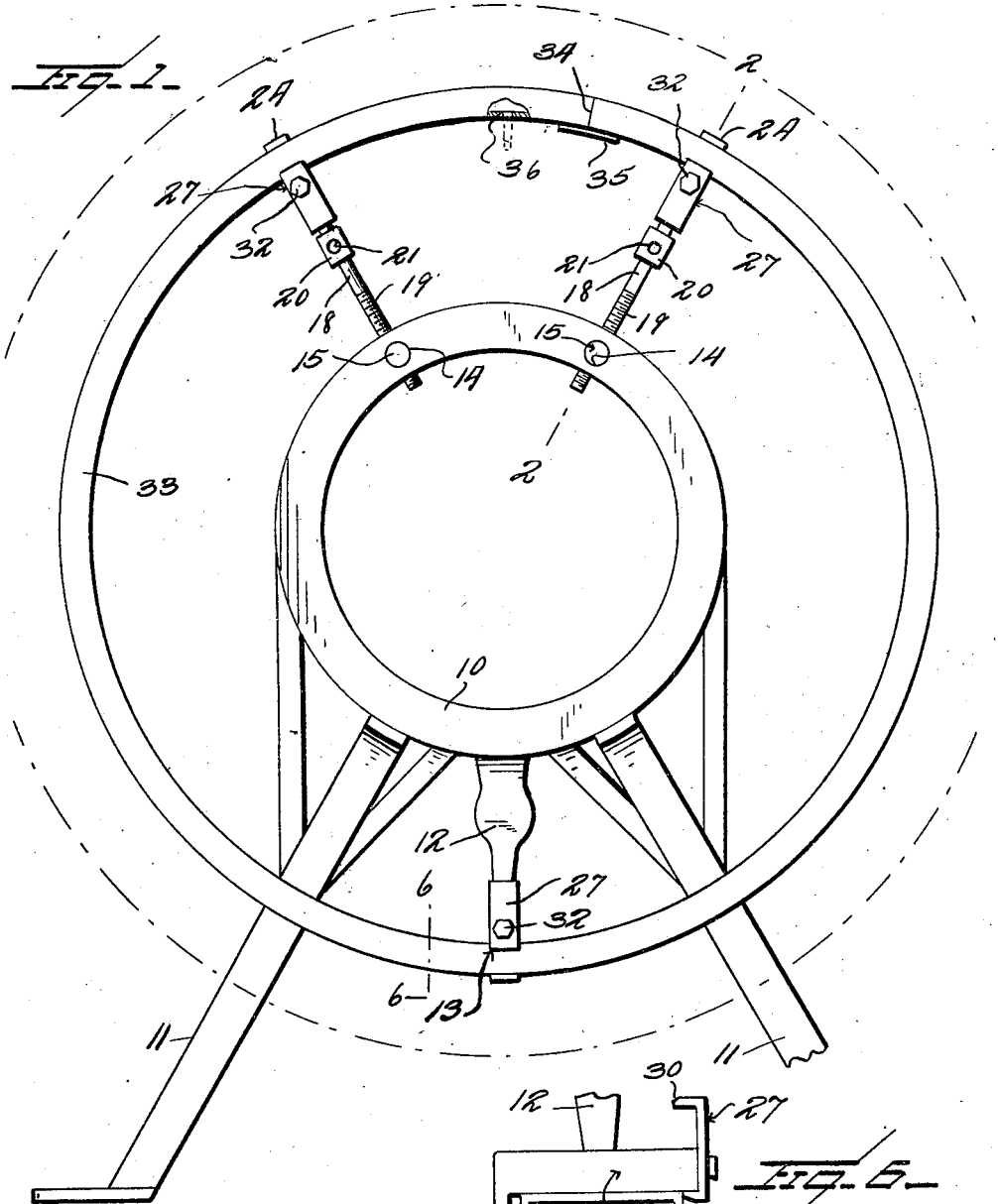

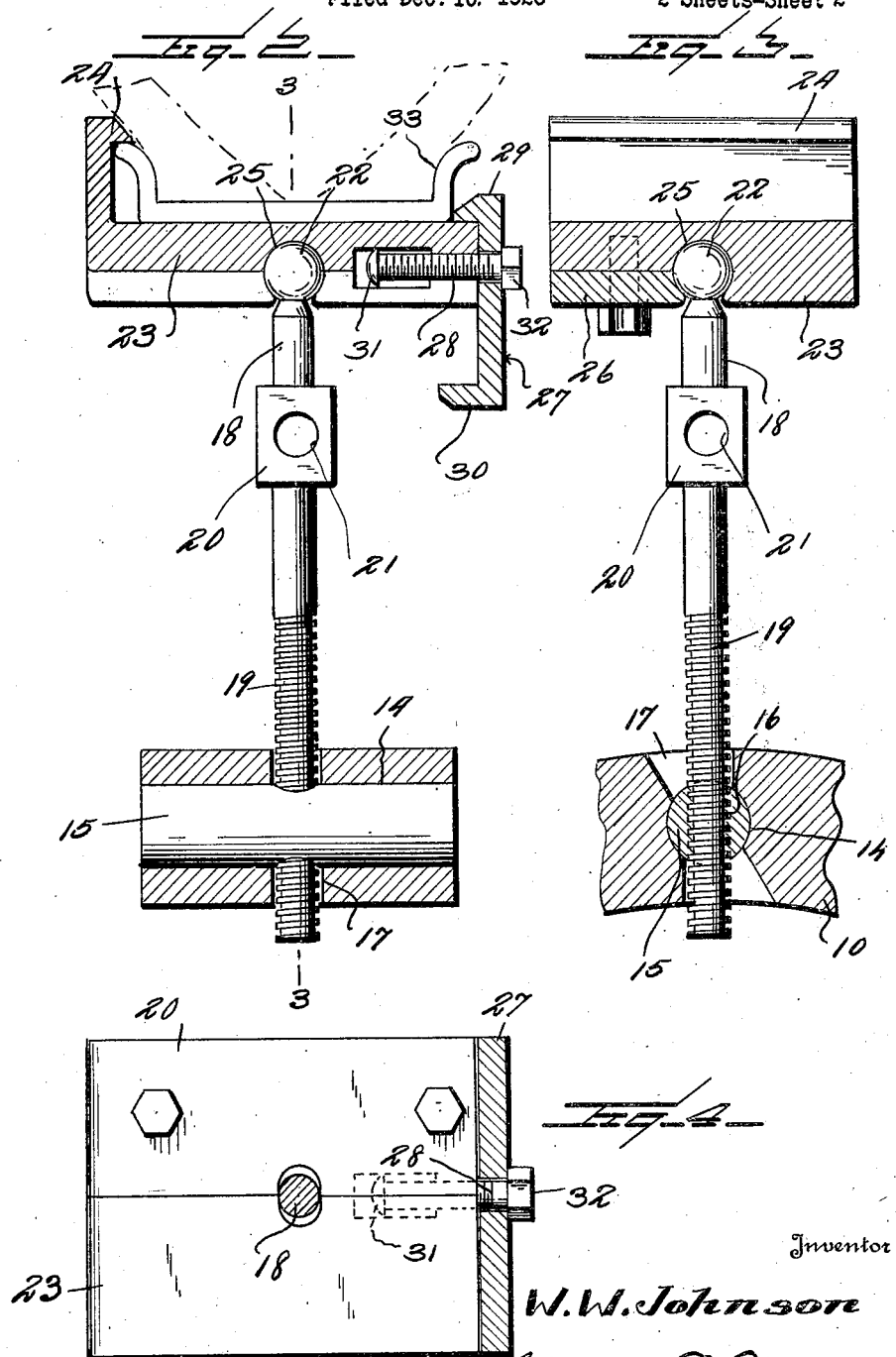

1,662,974

UNITED STATES PATENT OFFICE.

WILLIAM W. JOHNSON, OF VINCENNES, INDIANA, ASSIGNOR OF ONE-HALF TO WILLIAM STEINCAMP, OF LITTLE ROCK, ARKANSAS.

TIRE CARRIER AND REMOVER.

Application filed December 10, 1926. Serial No. 153,858.

This invention relates to devices for supporting spare tires and rims, if the tires are carried upon rims, and the general object of the invention is to provide a rack of this character which will not only support the spare tires and rims being carried upon an automobile but is so constructed that a rim and tire may be readily separated to permit the tire or casing to be removed from a rim or replaced thereon.

A further object is to provide a device of this character which may be readily arranged to suit all makes of cars and may be readily mounted thereon and which is relatively simple and effective.

Still another object is to provide rim or tire engaging members mounted on the ends of screw jacks, these members being so constructed that they will support a rim or a rim and tire and when engaged with the rim may either be contracted or expanded so as to contract the rim and permit the removal of a tire therefrom or the placement of a tire thereon, and which will when expanded, hold the rim and tire in proper position.

A still further object is to provide a device of this character having screw jacks which may be manipulated by means of an ordinary wrench used in removing the nuts holding the clincher lugs upon tire rims.

Other objects will appear in the course of the following description.

My invention is illustrated in the accompanying drawings wherein:—

Figure 1 is an elevation of a rim and tire carrier constructed in accordance with my invention;

Fig. 2 is a sectional view on the line 2—2 of Figure 1;

Fig. 3 is a section on the line 3—3 of Figure 2;

Fig. 4 is an underside view of one of clamping plates showing the lug plate and the stem in section;

Fig. 5 is an elevation of the standard wrench used in operating this tire carrier.

Fig. 6 is a section on the line 6—6 of Figure 1.

Referring to these drawings 10 designates a central, preferably annular, supporting member which is made of relatively heavy and rigid material and which is supported from the car by brackets 11 of any suitable character, this central supporting member being offset with relation to the plane of the brackets. Extending downward from this supporting member is a rigid stem 12, illustrated as tapering towards its outer end, and disposed radially with relation to the central support. On the extremity of this arm or stem there is disposed a rim clinching member 13, whose specific character will be more fully described later.

The annular supporting member 10 is provided at two points with the transversely extending openings 14 and disposed in these openings are the oscillatable pins 15. Each of these pins is formed with a diametrically extending, screw-threaded passage 16 and extending inward from the inner and outer faces of this supporting member 10 are the slots 17 which intersect the passages 14. Having screw-threaded engagement with these pins 14 are the jack screws 18, these having square screw-threads 19 at their inner ends which engage in the screw-threaded openings 15. The middle portion of each jack screw is enlarged, as at 20, and formed with a plurality of diametrically extending openings 21 for the insertion of a wrench or bar, whereby the jack screw may be turned. The outer end of each jack screw is formed with a semi-spherical head 22.

Coacting with each jack screw is a rim clinching member in the form of a plate 23, one end of which is formed with the overhanging lug or undercut lug 24. This plate 23 is formed to provide a socket 25 for the reception of the semi-spherical head on the outer end of the jack screw. Preferably this socket is partially formed in the clincher plate 23 and the remainder of the socket is formed by a plate 26 which is preferably made in two sections, one of the sections being rigidly connected to the plate 23 and the other being removable therefrom and held thereto by bolts, screws, or any other suitable means.

Attached to the end of the plate 23 opposite the lug 24, is a reversible lug 27. This consists of a plate which is attached to the plate 23 by means of the screw 28 so that the lug 27 may be reversed with relation to the outer face of the clincher plate 23. This reversible lug 27 at its ends is formed with the flanges 29 and 30, the flange 29 extending at right angles to the inner face of the lug 27 and the flange 30 extending inward at an inclination to the inner face of the plate or being undercut in other words. The screw 28 passes loosely through the reversible lug 27 and has its inner end 31 enlarged so that this screw 28 will only unscrew sufficiently to permit the lug 27 to reverse but will not come clear out of plate 23. The head 32 on the extremity of this bolt or screw is of the same diameter as the ordinary lug nut on the rim so as to permit the usual lug nut wrench to be used in unscrewing or screwing up the member 28. The rim and tire clinching member 13 is constructed in the same manner as is the member 23 and is likewise provided with the reversible lug 27.

I have illustrated an ordinary rim 33 mounted upon this rack, this rim being illustrated as split at 34 and provided with the usual pivoted latch 35 for holding the rim locked at its split end. This rim is provided with the usual aperture 36 to receive the inflation valve of the tire. The openings 21 extending through the jack screws are of such size that the usual wrench A commonly used in removing the nuts from the lug bolts of the rim may also be used for rotating the jack screws.

The operation of this mechanism will be obvious from what has gone before. When a spare casing is being carried, the jack screws should be firmly screwed up against the rim, if a rim is used for carrying the casing or tire, so that the bolts will not give. The straight flanges 29 of the reversible lugs 27 should be placed next adjacent to permit full inflation. To remove the casing from the rack a wrench is used which will fit the head 32 on the lug screw 28 and which also may be used as a lever fitting the holes 21 in the jack screws. The screws 28 are first loosened to loosen the reversible lugs 27 and these lugs are then turned so as not to obstruct the removal of the rim and tire. The jack screws 18 are then turned so as to contract and withdraw the clincher plates 23 from their engagement with the rim or with the casing or tire if no tire rim is used. The rim and tire or the tire itself may then be readily removed.

If it be desired to use this rack as a means for removing a casing from a rim, the rim 33 is placed upon the rack with the split 34 midway between the jack screws 18. The rim is to be pushed securely under the projecting flanges 24 of all of the clincher plates 13 and 23. The reversible lugs 27 are then to be turned so that the flanges 30 will engage over the rim and the screws 28 turned home. The latch 35 is then released and by means of the lug wrench A one of the jack screws is rotated to contract it to thus contract one end of the rim inward of the other end of the rim to thus unjoint the rim and after this has been secured the other jack screw may be rotated to contract it to thus fully contract the rim and permit the ready removal of the tire or casing. A reverse operation will force the rim up into tight contact with the tire or casing and when the rim is in its proper position, it may be latched by means of the usual latch 35.

It will be seen that I have provided a safe and durable rack for carrying a spare tire and that this mechanism also constitutes an effective device for removing a casing from a rim to allow repairs to be made or to permit a new casing to be applied upon a rim. By this mechanism casings can be removed or replaced in a few minutes and repairs may be made with the casing resting upon the rim and thus permit the workman to stand while making his repairs. While I have particularly designed this rack to be mounted upon the rear end of an automobile, it may also be mounted upon the wall of a garage and used as a work holder in making repairs on casings. When not carrying spare tires or rims, the jack screws may be screwed inward so as to project but a slight distance beyond the support 10 or the jack screws may be taken off and carried in the tool box. All parts of this mechanism should be made to suit the size, shape and strength of the casing to be carried or removed. It will be seen that this device will not crimp or twist the rim, that it is relatively simple, and that it may be supported in any convenient way upon the car.

It is obvious that many changes may be made in the details of construction and arrangement of parts without departing from the spirit of the invention as defined in the appended claim.

I claim:—

A tire carrier and rim remover comprising an annular support, pins mounted for oscillatory movement in the support, the support having cone-shaped slots disposed at opposite sides of the pins, screw jacks threaded through the pins and passing through the supports, said jacks being provided at their outer ends with hemispherical heads, clincher members having sockets which receive the hemispherical heads and plates applied to the clincher members and having edge portions disposed under the heads of the screw jacks, the adjacent edge surfaces of the plates being spaced from the sides of the screw jacks.

In testimony whereof I hereunto affix my signature.

WILLIAM W. JOHNSON.